(12) United States Patent
Secord

(10) Patent No.: US 9,889,739 B2
(45) Date of Patent: Feb. 13, 2018

(54) UNIVERSAL COMBINATION METERS

(71) Applicant: Toyota Motor Engineering & Manufacturing North America, Inc., Erlanger, KY (US)

(72) Inventor: Nathaniel J. Secord, Toledo, OH (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/982,011

(22) Filed: Dec. 29, 2015

(65) Prior Publication Data

US 2017/0050522 A1    Feb. 23, 2017

Related U.S. Application Data

(60) Provisional application No. 62/206,020, filed on Aug. 17, 2015.

(51) Int. Cl.
*B60K 35/00* (2006.01)

(52) U.S. Cl.
CPC ...... *B60K 35/00* (2013.01); *B60K 2350/1064* (2013.01); *B60K 2350/352* (2013.01); *B60K 2350/925* (2013.01)

(58) Field of Classification Search
None
See application file for complete search history.

(56) References Cited

U.S. PATENT DOCUMENTS

| | | | |
|---|---|---|---|
| 8,692,660 B2* | 4/2014 | Fitzgerald et al. | 340/441 |
| 8,976,014 B2 | 3/2015 | Magner et al. | |
| 9,430,475 B2* | 8/2016 | Powell et al. | 715/771 |
| 2005/0228556 A1* | 10/2005 | Kojima | B60K 37/02 701/31.4 |
| 2013/0009460 A1 | 1/2013 | Speach | |
| 2014/0333729 A1* | 11/2014 | Pflug | G06T 15/20 348/47 |
| 2015/0001870 A1 | 1/2015 | Parcher | |
| 2015/0015376 A1 | 1/2015 | Jenkins | |
| 2015/0197205 A1 | 7/2015 | Xiong et al. | |

* cited by examiner

*Primary Examiner* — Brent Swarthout
(74) *Attorney, Agent, or Firm* — Dinsmore & Shohl LLP

(57) ABSTRACT

Universal combination meters, methods for customizing a universal combination meter, and electronic dashboards are disclosed. A universal combination meter may include a processing device and a non-transitory, processor-readable storage medium. The non-transitory, processor-readable storage medium may include one or more programming instructions that, when executed, cause the processing device to monitor one or more data transmissions between a manufacturing computer and a vehicle, determine at least one of a model and a body type of the vehicle from information in the data transmissions, retrieve at least one of an image, vehicle-specific features, and vehicle-specific information from a repository, and load the at least one of the image, the vehicle-specific features, and the vehicle-specific information for displaying. The at least one of the image, vehicle-specific features, and vehicle-specific information correspond to the at least one of the model and the body type of the vehicle.

17 Claims, 7 Drawing Sheets

UNIVERSAL COMBINATION METERS

CROSS-REFERENCE TO RELATED APPLICATIONS

This application claims the benefit of U.S. Provisional Patent Application Ser. No. 62/206,020, entitled "UNIVERSAL COMBINATION METERS," filed on Aug. 17, 2015, the entire disclosure of which is hereby incorporated by reference herein.

TECHNICAL FIELD

The present specification generally relates to electronic dashboard components and, more specifically, to a combination meter portion of an electronic dashboard.

BACKGROUND

Vehicle components have become increasingly more customizable, both to match user preferences and for aesthetic purposes. For example, a display portion of an electronic dashboard of a vehicle may include information and images that are specific to the particular vehicle in which it is installed. For example, the display may show an exact image of the vehicle when displaying various vehicle features, such as, for example, a "door ajar" warning so that an observer recognizes exactly which door is open. Because manufacturers typically manufacture several different vehicle models, each having one or more body styles, the exact image of the vehicle to display may vary. Currently, an electronic dashboard that is specific to a particular model and body style must be made for each model and body style. Such a requirement increases the number of variations of the electronic dashboard, which can lead to increased cost.

Accordingly, a need exists for a universal electronic dashboard or component thereof that is customizable such that the electronic dashboard can be installed in any of a manufacturer's vehicles, regardless of model or body type, yet still display images, information, and features that are specific to each vehicle model and body type in which it is installed.

SUMMARY

In one embodiment, a universal combination meter includes a processing device and a non-transitory, processor-readable storage medium. The non-transitory, processor-readable storage medium includes one or more programming instructions that, when executed, cause the processing device to monitor one or more data transmissions between a manufacturing computer and a vehicle, determine at least one of a model and a body type of the vehicle from information contained within the one or more data transmissions, retrieve at least one of an image, vehicle-specific features, and vehicle-specific information from a repository, and load the at least one of the image, the vehicle-specific features, and the vehicle-specific information into a memory for displaying. The at least one of the image, vehicle-specific features, and vehicle-specific information correspond to the at least one of the model and the body type of the vehicle.

In another embodiment, a method of customizing a universal combination meter includes monitoring, by a processing device, one or more data transmissions between a manufacturing computer and a vehicle, determining at least one of a model and a body type of the vehicle from information contained within the one or more data transmissions, retrieving at least one of an image, vehicle-specific features, and vehicle-specific information from a repository, and loading the at least one of the image, the vehicle-specific features, and the vehicle-specific information into a memory for displaying. The at least one of the image, vehicle-specific features, and vehicle-specific information correspond to the at least one of the model and the body type of the vehicle.

In yet another embodiment, a electronic dashboard of a vehicle includes a universal combination meter. The universal combination meter includes a display, a vehicle information repository, a processing device, and a non-transitory, processor-readable storage medium. The non-transitory, processor-readable storage medium includes one or more programming instructions that, when executed, cause the processing device to monitor one or more data transmissions between a manufacturing computer and the vehicle, determine at least one of a model and a body type of the vehicle from information contained within the one or more data transmissions, retrieve at least one of an image, vehicle-specific features, and vehicle-specific information from the vehicle information repository, and load the at least one of the image, the vehicle-specific features, and the vehicle-specific information into a memory for displaying on the display. The at least one of the image, vehicle-specific features, and vehicle-specific information correspond to the at least one of the model and the body type of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein are generally directed to an electronic dashboard component, such as a combination meter, that is universal in the sense that it can be installed in any of a plurality of vehicle models and/or body types, yet still be customized to display images, information, and features that are specific to a particular model and/or body type in which the combination meter is installed. The combination meter functions by monitoring data transmissions between a manufacturing computer and the vehicle and intelligently determining the model and/or body type of the vehicle from those transmissions without requiring additional programming. The combination meter then selects stored images, information, and features specific to the particular model and body type for display.

Figure 1:
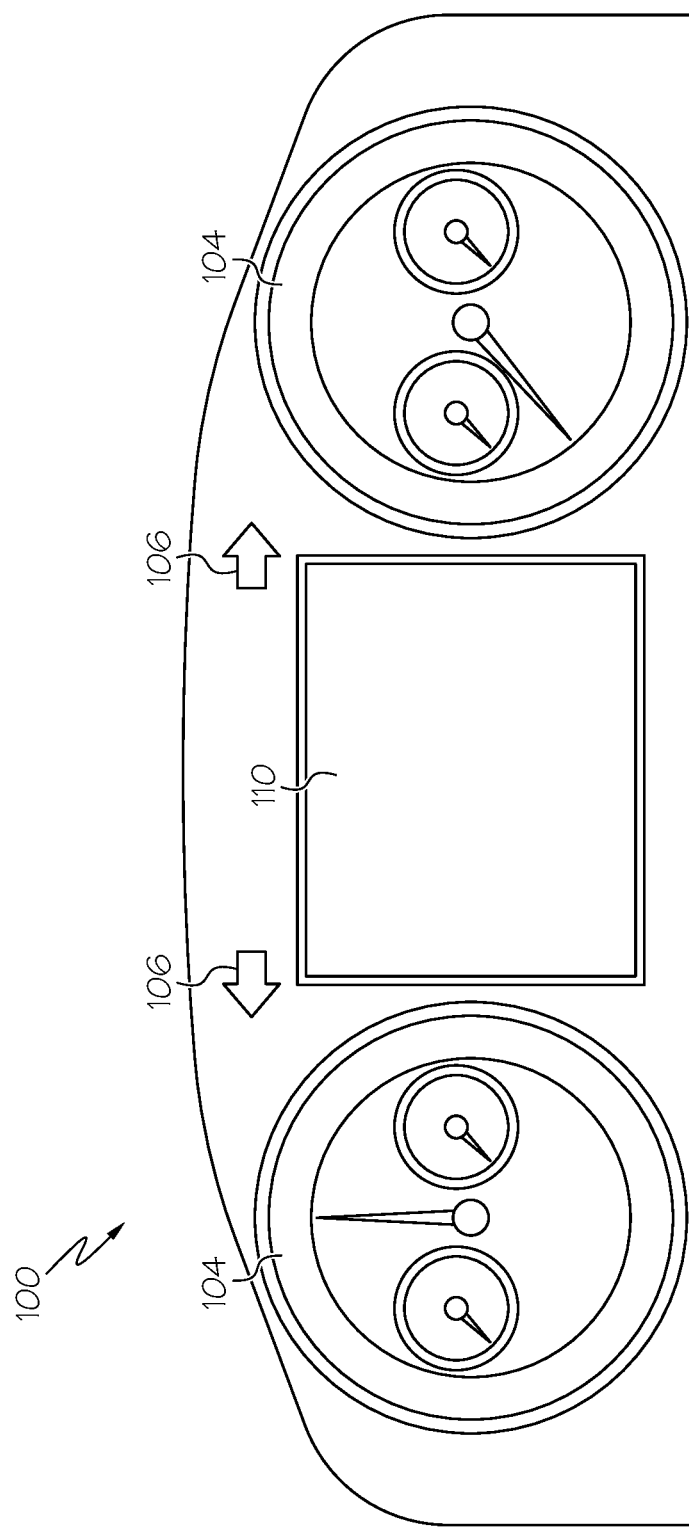
FIG. 1 depicts an illustrative electronic dashboard according to one or more embodiments shown and described herein.

As used herein, an "electronic dashboard" refers to a dashboard of a vehicle or any component thereof that contains an electronic element. One such illustrative electronic dashboard is depicted in FIG. 1. As shown in FIG. 1, the electronic dashboard 100 may include, for example, a combination meter 110, one or more gauges 104, one or more turn signals 106 and/or the like. The combination meter 110 may generally include a display screen. The one or more gauges 104 may include, for example, a speedometer, a tachymeter, a fuel gauge, a temperature gauge, an oil pressure gauge, an odometer, a trip meter, a tire pressure monitoring system, and/or the like. The electronic dashboard 100 may also include other gauges 104 not described herein without departing from the scope of the present disclosure. In some embodiments, the one or more gauges 104 may be displayed by the combination meter 110. Accordingly, the one or more gauges 104 may be a portion of the combination meter 110 rather than separate elements as depicted in FIG. 1.

The various components of the electronic dashboard 100 may generally be located and arranged in any location within the vehicle, and thus their location and arrangement are not limited by this disclosure. For example, as shown in FIG. 2, in some embodiments, the combination meter 110 may be located in a center stack of the vehicle, rather than behind a steering wheel (not shown), as depicted in FIG. 1.

As used herein, a "combination meter" generally refers to a device that obtains information from vehicle components and displays images, information regarding the vehicle, and vehicle features to a user, such as a driver or vehicle passenger. As such, the combination meter 110 may incorporate a display device, such as, for example, a light emitting diode (LED) display, an organic LED (OLED) display, an active-matrix organic light emitting diode (AMOLED) display, a liquid crystal display (LCD), a thin film transistor (TFT) LCD, an in-place switching (IPS) LCD, a touchscreen LCD, and/or any other display technology now known or later developed. In addition, the combination meter 110 may include a user interface such that a user of the combination meter 110 can interact with the combination meter 110 and provide one or more inputs. For example, a user of the combination meter 110 may use the user interface to change settings, adjust particular images to be viewed, scroll through information, toggle features, provide feedback, and/or the like. As such, the user interface may incorporate one or more hardware components, including, but not limited to, keyboard, a mouse, a joystick, a touch screen, a remote control, a pointing device, a video input device, an audio input device, a haptic feedback device, and/or the like.

As the electronic dashboard 100 incorporates the combination meter 110, it should be generally recognized that certain components and features described herein may be incorporated within the combination meter 110 or within the electronic dashboard 100 (but outside the combination meter 110). As such, the terms "electronic dashboard" and "combination meter" may be used interchangeably herein, unless specifically stated otherwise.

Figure 2:
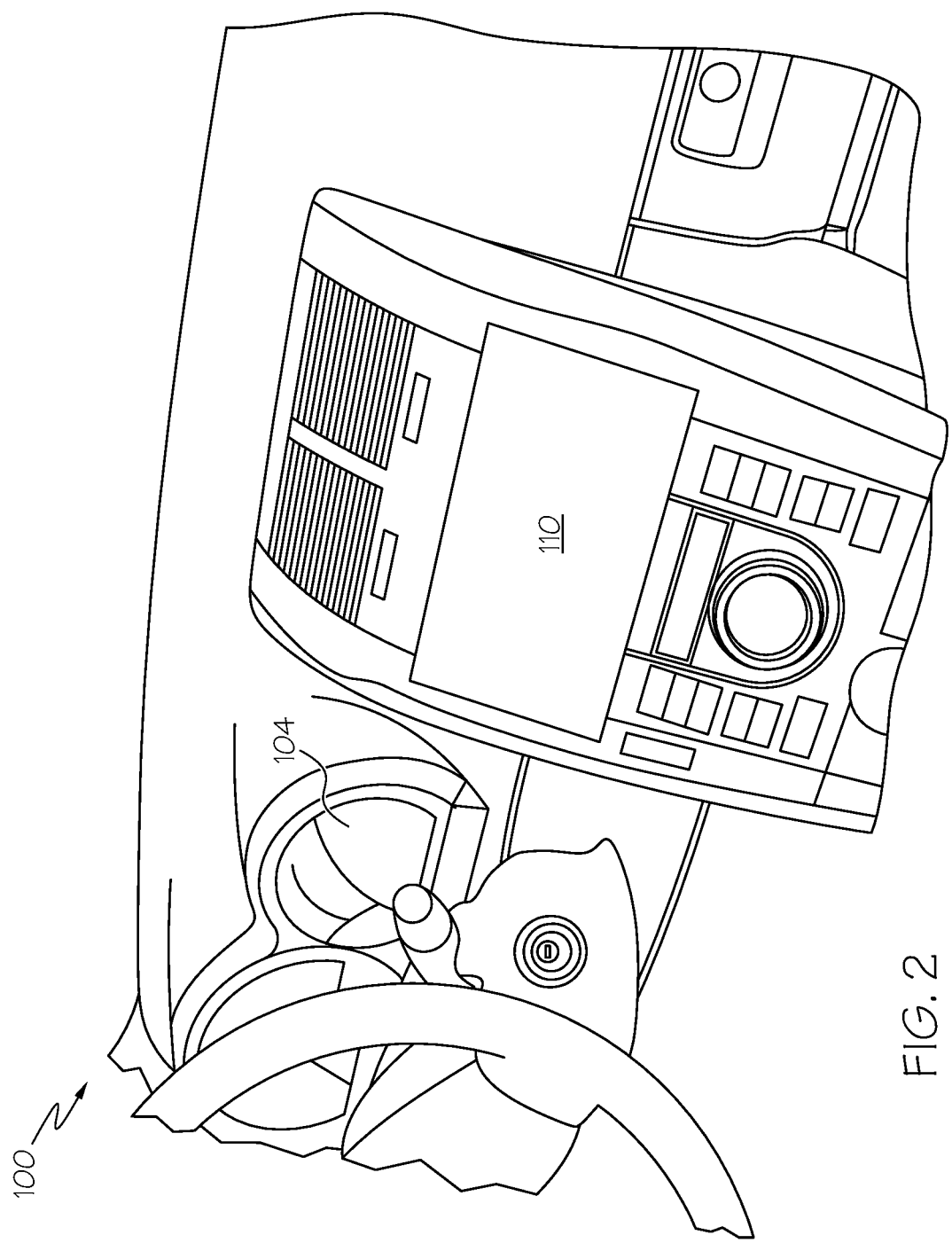
FIG. 2 depicts another illustrative electronic dashboard according to one or more embodiments shown and described herein.

As shown in FIGS. 3A-3D, in some embodiments, the combination meter 110 may display various vehicle gauges instead of, or in addition to, the gauges 104 depicted in FIGS. 1 and 2. For example, the combination meter 110 may display a fuel gauge 120, a temperature gauge 122, an odometer 124, and/or the like. In addition to the gauges, the combination meter 110 may display a vehicle status image 114. The vehicle status image 114 may contain one or more vehicle images 116, information, and/or features that correspond to the particular vehicle model and/or body type in which the combination meter 110 is installed.

The one or more vehicle images 116 may be pictographic representations of the vehicle. For example, as shown in FIGS. 3A-3D, the pictographic representation may be a top view of the vehicle. However, the one or more vehicle images 116 may include other views, such as side views, back views, isometric views, and/or the like without departing from the scope of the present disclosure. In addition, the one or more vehicle images 116 may be 2 dimensional views or 3 dimensional views. The one or more vehicle images 116 may be any type of image, such as, for example, a photographic representation, a line drawing, an artistic rendering, or the like. The one or more vehicle images 116 may be stored in a repository or a memory as image data. The one or more vehicle images 116 may be displayed on the combination meter 110 at the same time (e.g., side-by-side images) or may be displayed one at a time. For example, each of the one or more vehicle images 116 may automatically display for a period of time before the next image is displayed. In another example, a user may manipulate a user input to scroll between the one or more vehicle images 116.

The pictographic representation shown in the one or more vehicle images 116 may be specific to the vehicle in which the combination meter 110 is located. Thus, the one or more vehicle images 116 may correspond to a model and/or a body type of the particular vehicle in which the combination meter is installed. For example, the model may be a car (shown in FIG. 3C), an SUV, a crossover vehicle, a van (shown in FIG. 3D), a pickup truck (shown in FIGS. 3A-3B), or the like. The body type may be a more specific categorization of the vehicle. For example, the body type of a car may be a sedan, a hatchback, a coupe, a convertible, or the like. Similarly, the body type of the pickup truck may be a standard cab truck, a quad cab truck, an extended bed truck, or the like. Thus, the pictographic representation may correspond to the general dimensions of the vehicle such that an observer of the pictographic representation has a perception that he/she is looking at an actual photograph, live-image view, or scale model of the vehicle in which the combination meter 110 is located. That is, the user may recognize the one or more vehicle images 116 as being representative of the model and/or body type of the vehicle in which it is located.

In addition to the model and the body type, the pictographic representation may also accurately depict certain vehicle features that are specific to that particular vehicle. Illustrative features may include, but are not limited to, a number of doors on the vehicle, a location of each of the doors on the vehicle, a location of a fuel flap, a location of an engine bay hood, location of a trunk or other storage compartment, presence and/or location of a sun roof, and/or the like. For example, the pictographic representation of the vehicle may include 2 doors, 3 doors, 4 doors, 5 doors, or more, which corresponds to the number of doors that are actually on the vehicle. The pictographic representation may also accurately depict the opening movement of the doors. For example, certain doors may open toward the front of the vehicle, whereas other doors may open toward the rear of the vehicle ("suicide doors"), other doors may open up and outward ("butterfly doors"), other doors may open vertically ("canopy doors"), other doors may open upwards ("gullwing doors"), other doors may rotate vertically upwards ("scissor doors"), and other doors may slide horizontally along the vehicle body (i.e., doors that are commonly found on a minivan).

Figure 3A:
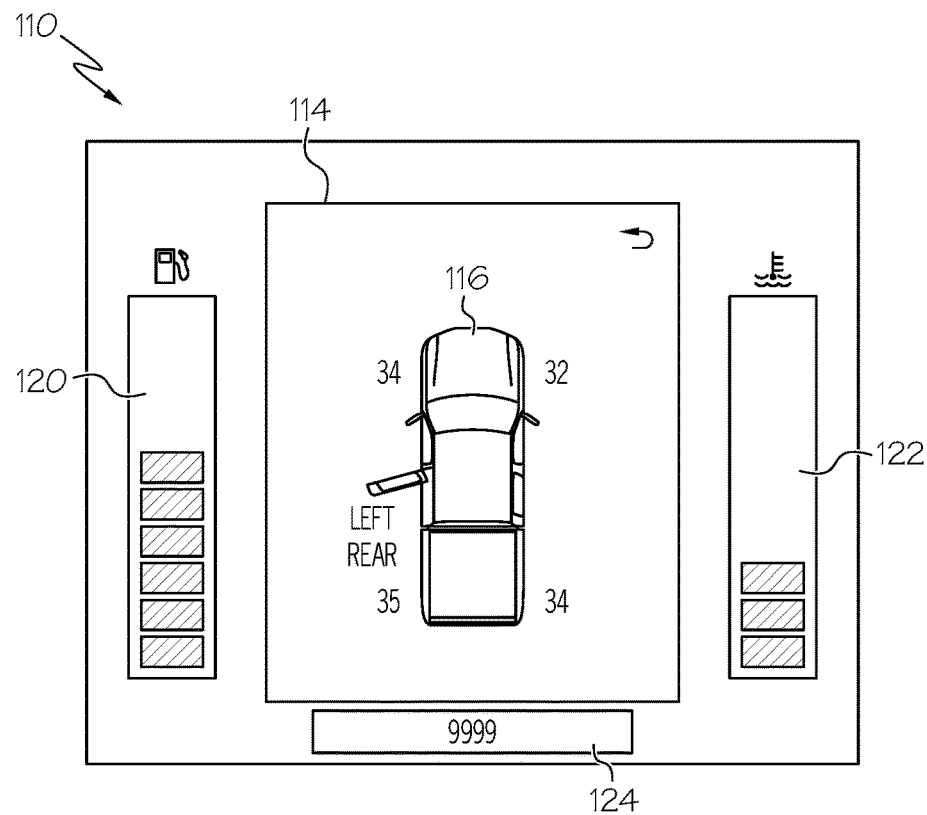
FIG. 3A depicts a combination meter on an electronic dashboard having a first illustrative pictographic representation according to one or more embodiments shown and described herein.
Figure 3B:
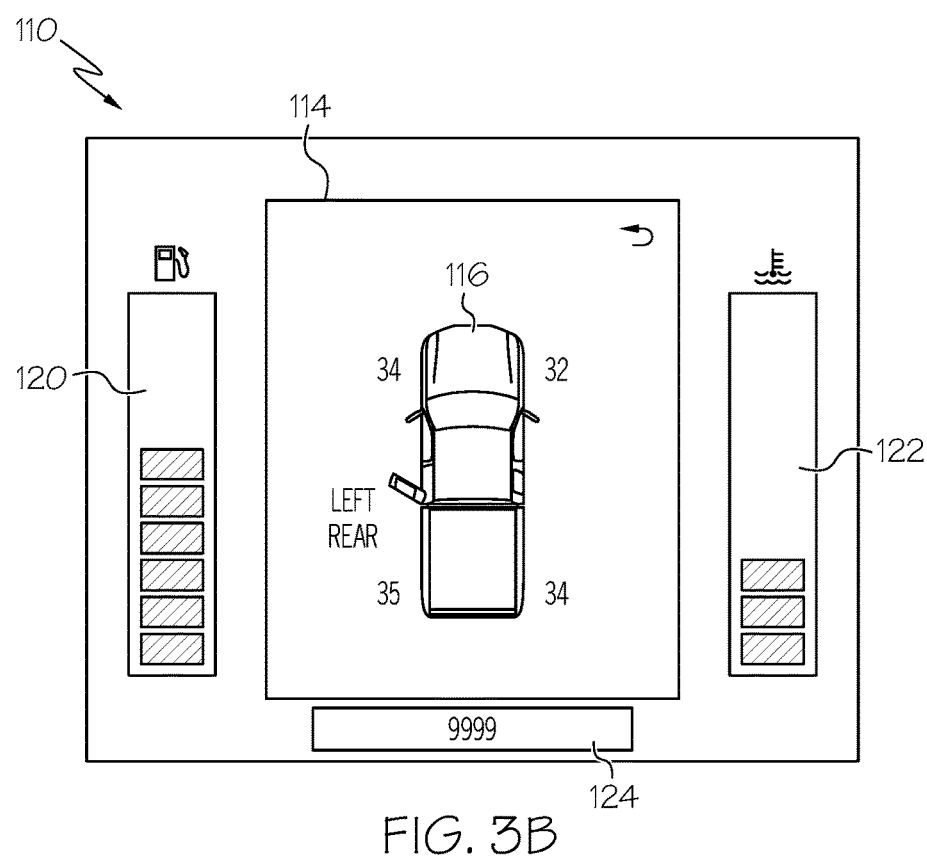
FIG. 3B depicts a combination meter on an electronic dashboard having a second illustrative pictographic representation according to one or more embodiments shown and described herein.
Figure 3C:
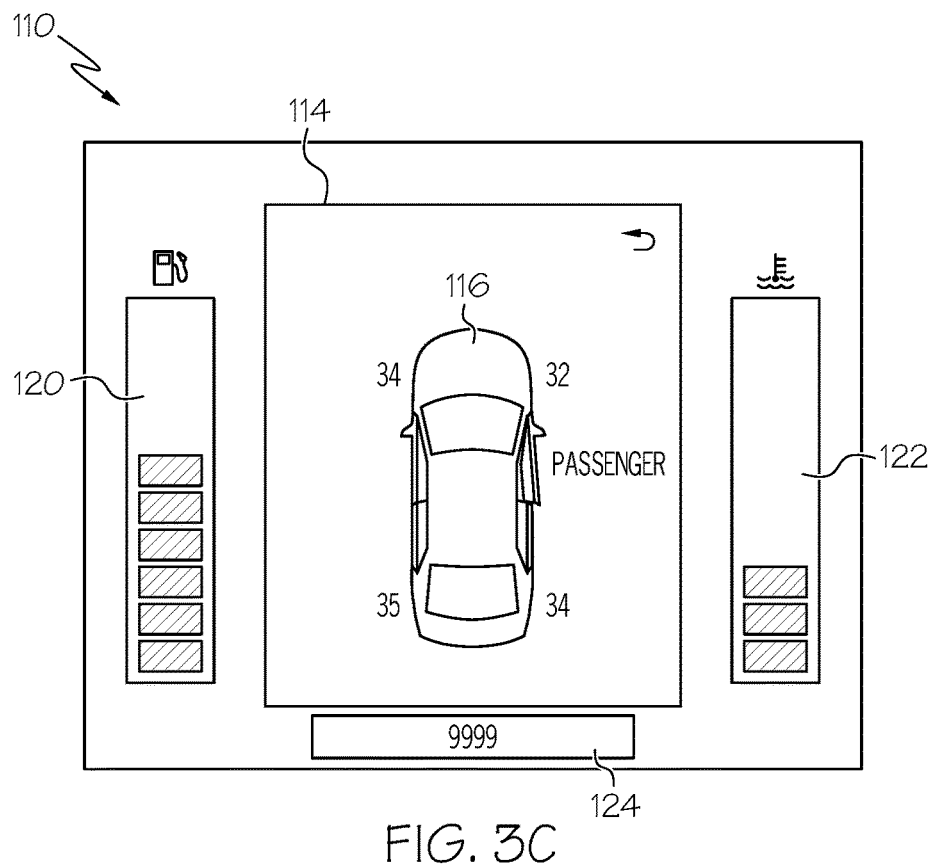
FIG. 3C depicts a combination meter on an electronic dashboard having a third illustrative pictographic representation according to one or more embodiments shown and described herein.
Figure 3D:
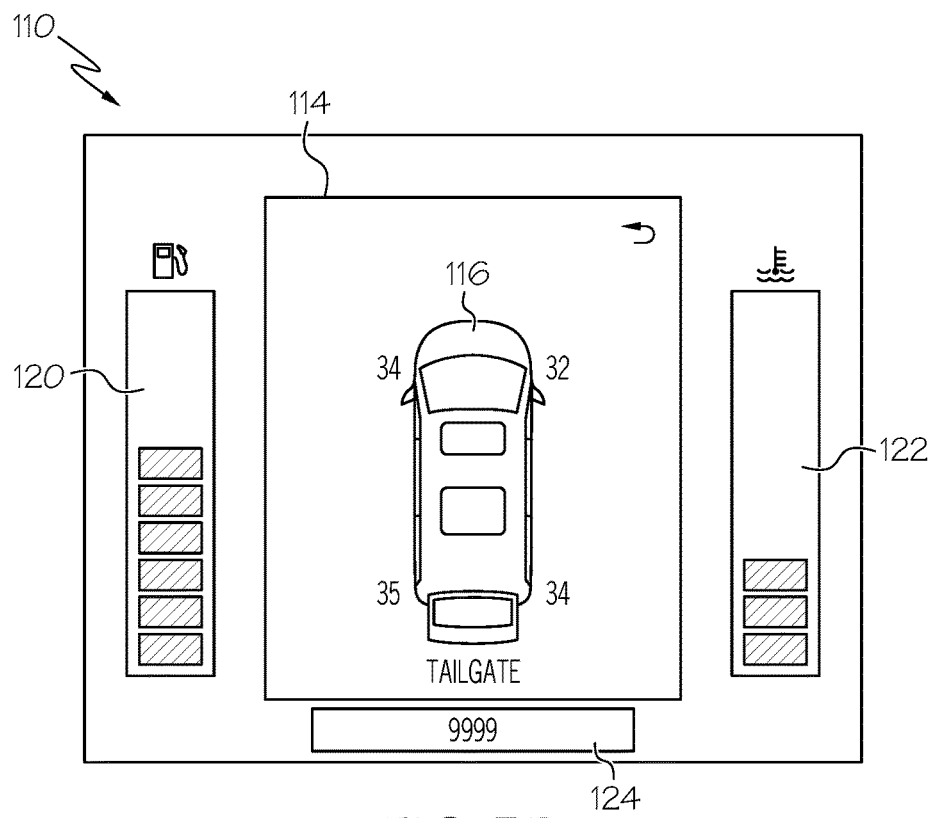
FIG. 3D depicts a combination meter on an electronic dashboard having a fourth illustrative pictographic representation according to one or more embodiments shown and described herein.

For example, FIG. 3A depicts the left rear side door as open toward the front of the vehicle, while also displaying the words "LEFT REAR" to indicate to an observer that the driver's side rear door is open. FIG. 3B depicts the left rear side door as a suicide door that is opened toward the rear of the vehicle, while also displaying the words "LEFT REAR" to indicate to an observer that the driver's side rear door is open. FIG. 3C depicts the right side front door as open toward the front of the vehicle, while also displaying the word "PASSENGER" to indicate to an observer that the passenger's door is open. FIG. 3D depicts the rear door as open, while also displaying the word "TAILGATE" to indicate to an observer that the tailgate door is open. It should generally be understood that the words used herein are merely illustrative. As such, in some embodiments, other words may be used in lieu of the words provided herein. In other embodiments, words may not be provided. In yet other embodiments, symbols may be used in lieu of words.

In addition to the vehicle images 116, the vehicle status image 114 may also display other vehicle-specific information. Such information is not limited by this disclosure, and may generally be any information that could potentially be of use to an observer. Information includes, but is not limited to, tire pressure, open/closed status of a door (as described above), an open/closed status of a fuel flap, an open/closed status of an engine bay hood, open/closed status of a window, an open or closed status of a sun roof, an open or closed status of a convertible top, whether certain doors are locked or unlocked, whether certain doors have child safety locks activated, a fuel level, an engine coolant temperature, status of various vehicle safety features (e.g., seat belt locks, air bag status), status of various vehicle security features (e.g., alarm, immobilization system) and/or the like. For example, as shown in FIGS. 3A-3D, the vehicle status image 114 may display a tire pressure for each of the tires on the vehicle. In the illustrated embodiment, a number is displayed in the general vicinity of each of the wheels on the vehicle image 116, such as the numbers "34," "32," "34," and "35" shown (in clockwise direction) in FIGS. 3A-3D. It should be generally understood that additional or fewer text, images, or the like that provide information may be displayed without departing from the scope of the present disclosure.

The combination meter 110 may be configured such that all images, information, and features, regardless of vehicle model or body type, may be stored as data within a repository. As such, the combination meter 110 contains images, information, and features for all vehicles in which it can be installed, even though only a portion of the images will ever be displayed. Accordingly, the combination meter 110 is universal with respect to the various vehicles in which it can be installed. That is, the combination meter 110 is the same, regardless of the vehicle in which it is installed. Use of the same combination meter 110 regardless of the vehicle type allows a manufacturer to install the exact same numbered part in all platforms that are produced. Such a universal feature eliminates the need for varying numbered parts for combination meters for each vehicle platform, even though the combination meters for varying vehicle platforms have the same physical dimensions and the same interfaces.

Figure 4:
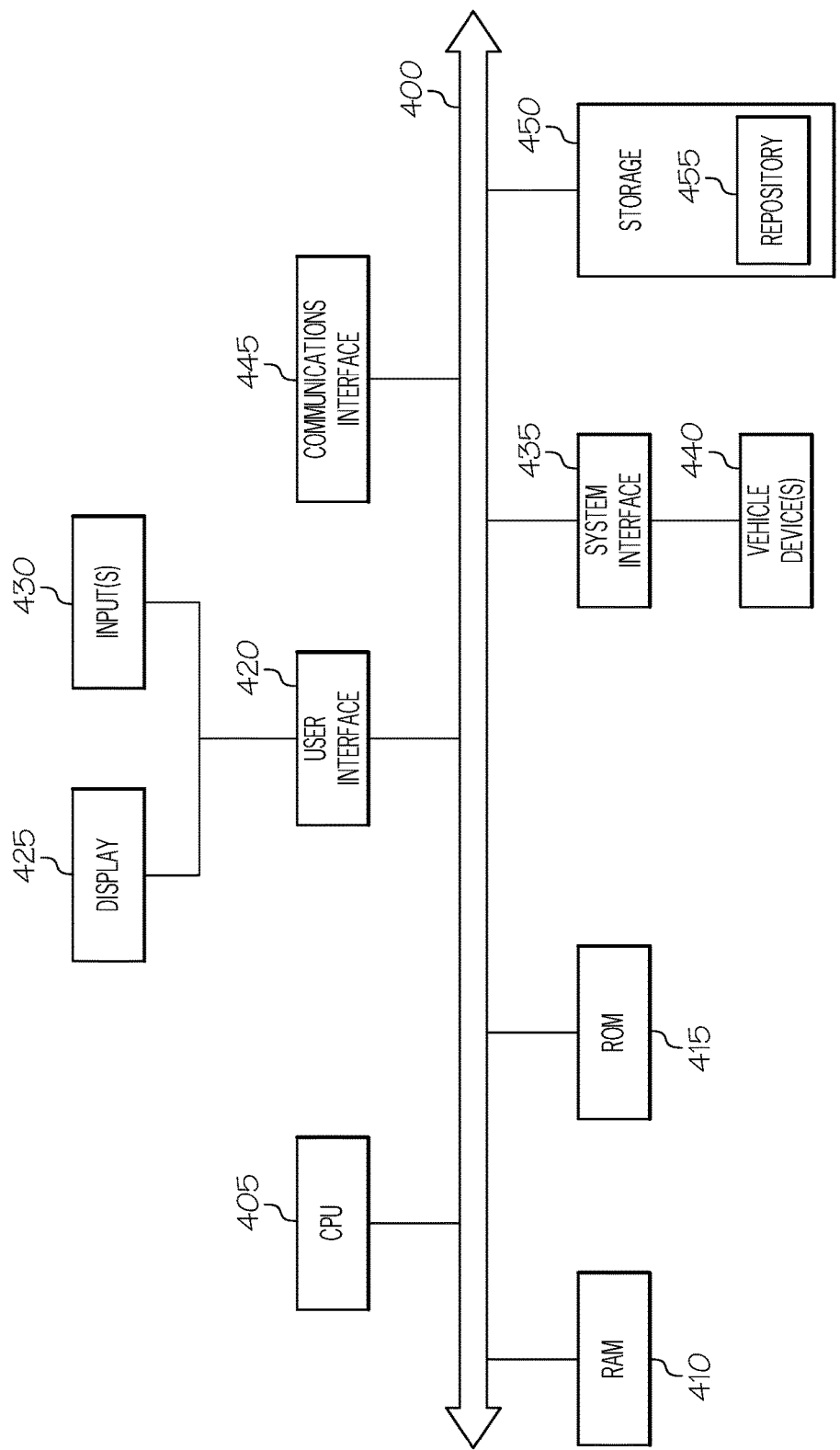
FIG. 4 depicts a schematic diagram of illustrative computer processing hardware components according to one or more embodiments shown and described herein.

The combination meter 110 and/or the electronic dashboard 100 (FIG. 1) may also incorporate a plurality of hardware components, particularly components that allow the combination meter 110 to receive and monitor data and accurately display the images, features, and information described herein. Illustrative hardware components of the combination meter 110 and/or the electronic dashboard 100 are depicted in FIG. 4. A bus 400 may interconnect the various components. A processing device, such as a computer processing unit (CPU) 405, may be the central processing unit of the computing device, performing calculations and logic operations required to execute a program. The CPU 405, alone or in conjunction with one or more of the other elements disclosed in FIG. 4, is an illustrative processing device, computing device, processor, or combination thereof, as such terms are used within this disclosure. Memory, such as read only memory (ROM) 415 and random access memory (RAM) 410, may constitute illustrative memory devices (i.e., non-transitory processor-readable storage media). Such memory 410, 415 may include one or more programming instructions thereon that, when executed by the CPU 405, cause the CPU 405 to complete various processes, such as the processes described herein. Optionally, the program instructions may be stored on a tangible computer-readable medium such as a compact disc, a digital disk, flash memory, a memory card, a USB drive, an optical disc storage medium, such as a Blu-Ray™ disc, and/or other non-transitory processor-readable storage media.

A storage device 450, which may generally be a storage medium that is separate from the RAM 410 and the ROM 415, may contain a repository 455 for storing the various images, information, and features described herein. The storage device 450 may be any physical storage medium, including, but not limited to, a hard disk drive (HDD), memory, removable storage, and/or the like. While the storage device 450 is depicted as a local device, it should be understood that the storage device 450 may be a remote storage device, such as, for example, a server computing device or the like.

An optional user interface 420 may permit information from the bus 400 to be displayed on a display 425 portion of the combination meter 110 (FIG. 1) in audio, visual, graphic, or alphanumeric format. Moreover, the user interface 420 may also include one or more inputs 430 that allow for transmission to and receipt of data from input devices such as a keyboard, a mouse, a joystick, a touch screen, a remote control, a pointing device, a video input device, an audio input device, a haptic feedback device, and/or the like. Such a user interface 420 may be used, for example, to allow a user to interact with the electronic dashboard 100 (FIG. 1) or any component thereof, including the combination meter 110.

A system interface 435 may generally provide the computing device with an ability to interface with one or more vehicle components 440, such as, for example, any sensors, gauges, electronic control units (ECU), and/or the like. Communication with vehicle components 440 may occur using various communication ports (not shown). An illustrative communication port may be attached to a communications network, such as the Internet, an intranet, a local network, a direct connection, and/or the like.

A communications interface 445 may generally provide the combination meter with an ability to interface with one or more external components, such as, for example, an external computing device, a remote server, and/or the like. Communication with external devices may occur using various communication ports (not shown). An illustrative communication port may be attached to a communications network, such as the Internet, an intranet, a local network, a direct connection, and/or the like.

Figure 5:
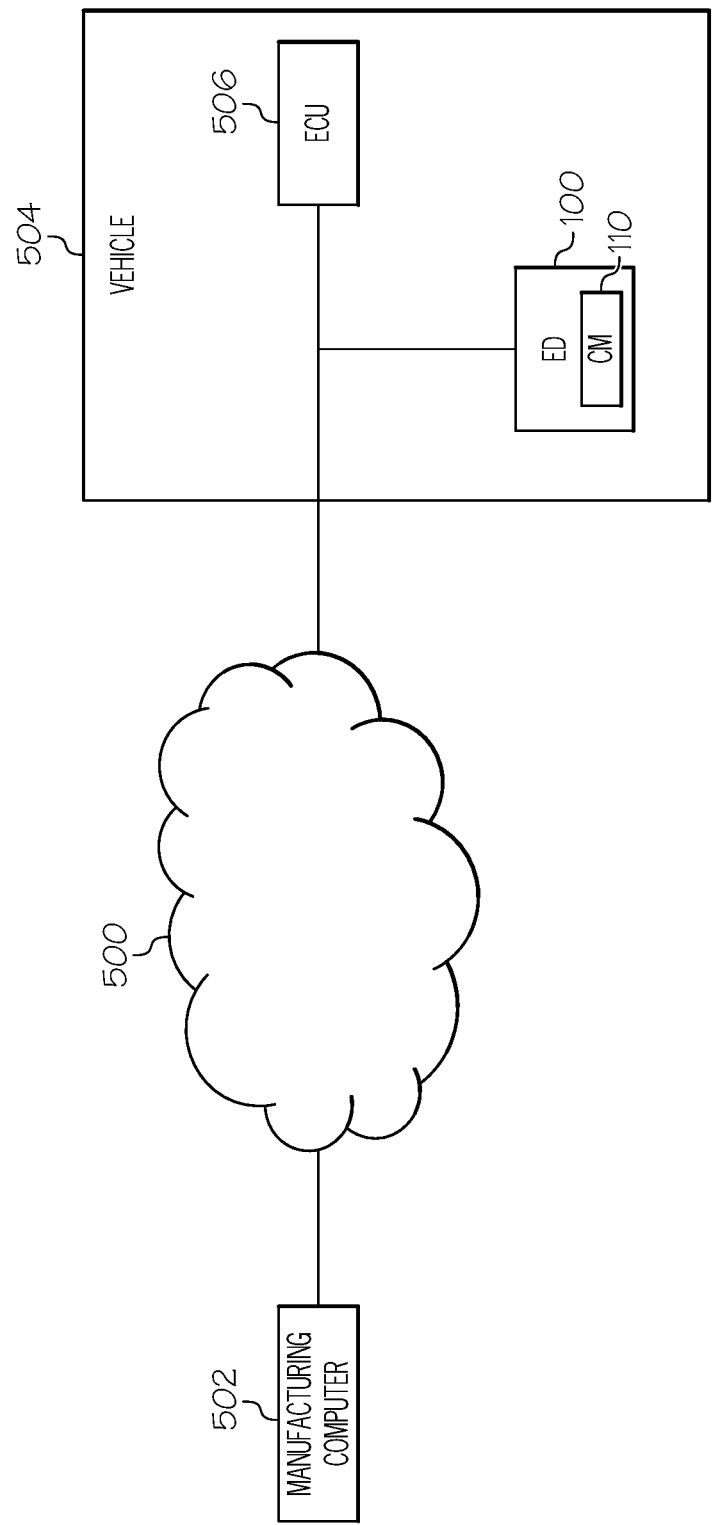
FIG. 5 depicts a schematic diagram of an illustrative computing network for transmitting data between a manufacturing computer and a vehicle according to one or more embodiments shown and described herein.

The system interface 435 and the communications interface 445 may provide the electronic dashboard and/or the combination meter with an ability to monitor data transmissions between the vehicle and an external device, as shown in FIG. 5. Particularly, the manufacturing computer 502 may be communicatively coupled to the vehicle 504 such that data may be transmitted between the manufacturing computer 502 and the vehicle 504. In some embodiments, the manufacturing computer 502 may be communicatively coupled to the vehicle 504 temporarily, such as, for example, only during manufacture of the vehicle. In some embodiments, the manufacturing computer 502 may be directly connected to the vehicle 504. In other embodiments, the manufacturing computer 502 may be communicatively coupled to the computer via a communications network 500, such as the Internet, an intranet, a local network, and/or the like. In some embodiments, the manufacturing computer 502 may interface with the vehicle 504 via a controller area network (CAN) bus. It should be understood that the CAN bus is a serial bus protocol that connects individual systems and sensors to allow automotive components to communicate. Moreover, it should be understood that the manufacturing computer 502 may be communicatively coupled to the CAN bus to provide programming instructions to the individual systems and sensors on the vehicle during manufacture of the vehicle.

The electronic dashboard 100 and/or the combination meter 110 are communicatively coupled to the various other components such that the electronic dashboard 100 and/or the combination meter 110 can monitor signals that are transmitted between the manufacturing computer 502 and the vehicle 504. Thus, the electronic dashboard 100 and/or the combination meter 110 may generally be communicatively coupled to the manufacturing computer 502 and the vehicle 504 at some location between the manufacturing computer 502 and the vehicle 504. For example, the combination meter 110 may be connected within the vehicle 504 to the CAN bus (not shown). As such, the combination meter 110 may be able to monitor the CAN bus for data transmissions that are transmitted via the CAN bus.

The manufacturing computer 502 may generally be any device that is capable of sending and receiving data to or from the vehicle 504. In particular, the manufacturing computer 502 may be a computing device that provides programming instructions to various components of the vehicle 504 during manufacture. For example, the manufacturing computer 502 may send and receive data from an electronic control unit (ECU) 506 of the vehicle 504. The ECU 506 is merely illustrative; thus, the manufacturing computer 502 may send and receive data to other vehicle components, such as, for example, a body control module (BCM), a door control unit (DCU), an engine control unit, an electric power steering control unit (PSCU), a human-machine interface (HMI), a powertrain control module (PCM), a seat control unit, a speed control unit (SCU), a telematic control unit, a transmission control unit, a brake control module, and a battery management system.

The data that is transmitted between the manufacturing computer 502 and the vehicle 504 may generally be any type of data, particularly data that can be used to determine the exact model of the vehicle and/or the exact body type of the vehicle. However, the data may be germane to the model and the body type. That is, the data may not specifically state that the vehicle is a particular body type and/or a particular model. Rather, such information may be culled from the data by the combination meter 110. For example, if the data contains configuration information for a vehicle system that is only present in one particular model or body type, the combination meter 110 may recognize such and use that information to appropriately customize the images, information, and features, as described herein. In another example, if the data contains information for a particular arrangement of vehicle systems that is only found in one particular model or body type, the combination meter 110 may recognize as such and use the information to appropriately customize the images, information, and features, as described herein. In some embodiments, certain data may be used to narrow down the list of possible models and/or body types, but additional data may be necessary to accurately pinpoint which particular model and/or body type from the narrower list. For example, the combination meter 110 may monitor a first data transmission and determine from the data contained therein that the vehicle 504 in which it is installed is one of three vehicle possibilities. Then the combination meter 110 may monitor a second data transmission and determine from the data contained therein that the vehicle 504 in which it is installed is only a single possibility from the original three possibilities. It is contemplated that additional data monitoring may be necessary to further narrow the list of vehicle possibilities.

Since the combination meter 110 can intelligently determine the model and/or the body type of the vehicle from data that is already transmitted between the manufacturing computer 502 and the vehicle 504, no additional programming is necessary to program the combination meter 110 to display the correct images, information, and features, thereby eliminating a time and a cost that may be associated with such additional programming.

Figure 6:
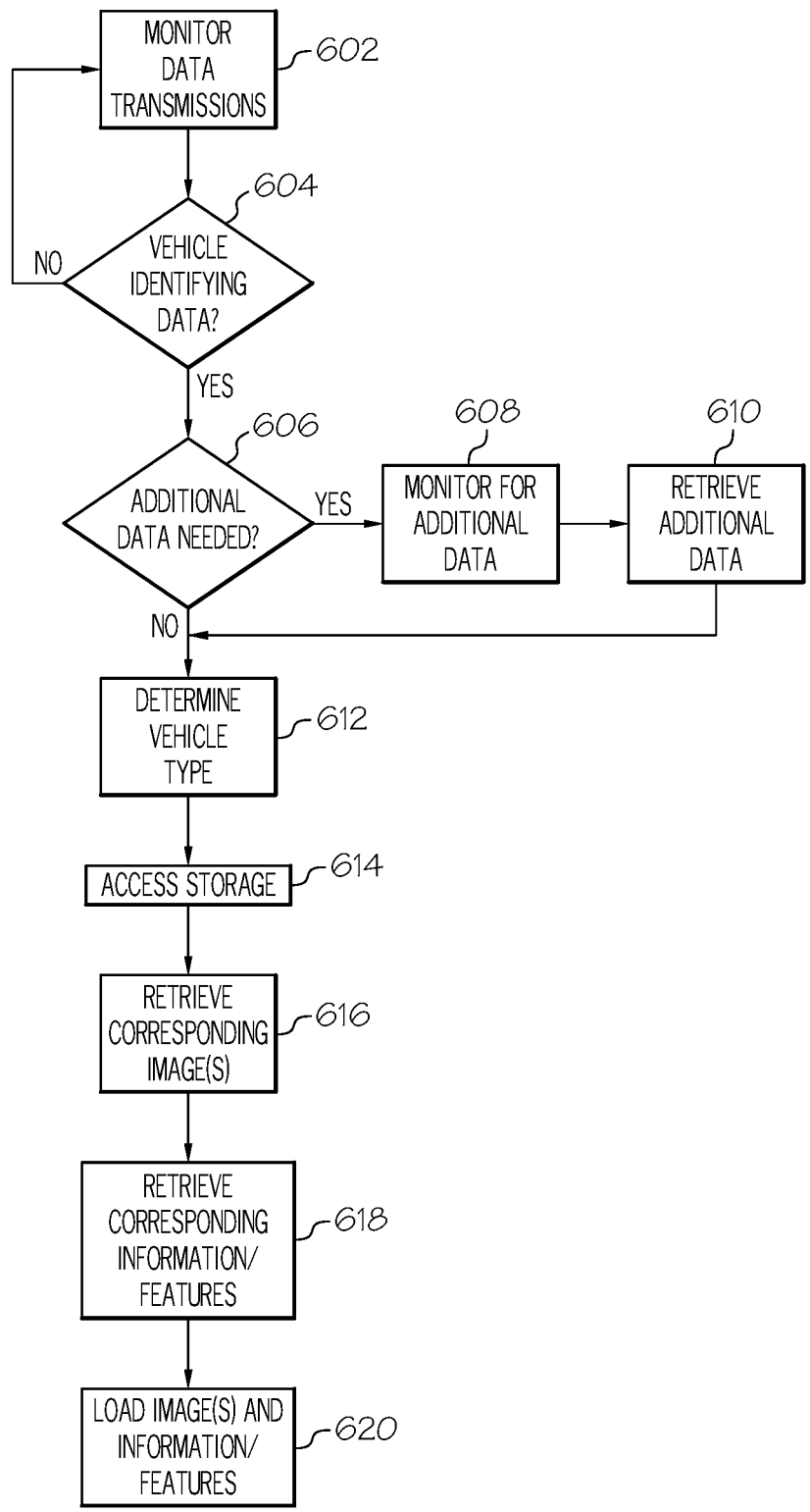
FIG. 6 depicts an illustrative flow diagram of a method of customizing a combination meter according to one or more embodiments shown and described herein.

FIG. 6 depicts a flow diagram of a process that the combination meter may follow to obtain data to intelligently determine the vehicle model and/or body type in which it is installed and accurately provide images, information, and features that are specific to that particular model and/or body type. The steps described with respect to FIG. 6 generally refer to the combination meter 110. However, it should be understood that such steps may be completed by the electronic dashboard 100 and/or any component thereof other than the combination meter 110 without departing from the scope of the present disclosure.

Referring to FIGS. 5 and 6, in step 602, the data transmissions between the manufacturing computer 502 and the vehicle 504 may be monitored. The data transmissions may generally by monitored via a connection to the communications link between the manufacturing computer 502 and the vehicle 504, such as a direct link to the CAN bus, as described in greater detail herein. That is, data may be transmitted from the manufacturing computer 502 to the vehicle via the CAN bus, which is linked to the combination meter 110 such that the combination meter 110 can read the data transmitted via the CAN bus, but without disrupting the transmissions between the manufacturing computer 503 and the vehicle 504.

In step 604, a determination may be made as to whether the monitored data transmission contains vehicle-identifying data therein. As described herein, the vehicle-identifying data itself may be germane to the exact model and/or body type of the vehicle, but may provide certain information or clues from which one or more models and/or body types may be identified by the combination meter 110. If vehicle-identifying data is not contained in the data transmission, the combination meter 110 may return to step 602 for additional monitoring.

In step 606, a determination may be made as to whether the vehicle-identifying data contains sufficient information to determine the exact vehicle model and/or body type in which the electronic dashboard 100 is installed. For example, if the vehicle-identifying data narrows the list down to a certain subset of models and/or body types, but does not provide enough information to identify an exact model and/or body type, the combination meter 110 may monitor for additional data in step 608 and retrieve the additional data in step 610. The additional data may also be germane to the exact model and/or body type of the vehicle, but may provide additional information or clues that the combination meter 110 can use to further limit the possibilities of vehicle model and/or body type to pick from the subset.

As a nonlimiting example, the manufacturing computer 502 may transmit a first data signal to the vehicle 504 that provides programming instructions for intelligently monitoring and transferring power to wheels in a four wheel drive (4WD) system. The combination meter 110, in monitoring the first data signal, may recognize that, based on the type of data that is transmitted, the vehicle in which it is installed must be a vehicle with a 4WD system. Accordingly, the combination meter 110 may determine a narrowed list of vehicles that are available with 4WD systems. As such, the combination meter 110 may recognize that the vehicle 504 is one of the vehicles from the narrowed list. The manufacturing computer 502 may transmit a second data signal to the vehicle 504 that provides programming instructions to the ECU for receiving signals from a suicide door sensor. The combination meter 110, in monitoring the second data signal, may recognize that, based on the type of data that is transmitted, the vehicle in which it is installed must be a vehicle with a suicide door. Accordingly, the combination meter 110 may determine a further narrowed list of vehicles that are available with a 4WD system and a suicide door. As such, the combination meter 110 may recognize that the vehicle 504 is one of the vehicles from the further narrowed list. If the further narrowed list is not a single vehicle, the combination meter 110 may continue to monitor for additional data signals between the manufacturing computer 502 and the vehicle 504 until the list is narrowed to only a single vehicle possibility.

Once the appropriate data has been retrieved, the combination meter 110 may determine the vehicle type in step 612, which includes determining the exact model, the exact body type, certain features that are available for a particular model and/or body type, and/or the like. The combination meter 110 may access storage in step 614, such as, for example, the storage device 450 containing the repository 455 (FIG. 4). From the storage, the combination meter 110 may retrieve the corresponding image(s) in step 616 and the corresponding information and/or features in step 618. Accordingly, data containing the corresponding images of vehicle specific information to be displayed may be transmitted from the storage to the combination meter 110. The image(s), the information, and/or the features may be loaded into local memory and stored as stored data in step 620, such as, for example, loaded and stored in the RAM 410 or the ROM 415 (FIG. 4) for quick access when such image(s), information, and features are needed for display. That is, the combination meter 110 may subsequently display pictographic images and/or information from the stored data.

Accordingly, the devices and methods described herein provide a universal combination meter component of an electronic dashboard that can be installed in any vehicle of a manufacturer's lineup and can be customized to display images, information, and features that are specific to the model and/or body type of the vehicle in which it is installed. The customization process is completed entirely by the combination meter by intelligently monitoring data transmissions between a manufacturing computer and the vehicle and intelligently determining the exact model and/or body type from data that is germane to such information, thereby not requiring any additional programming of the data transmitted between the manufacturing computer and the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A universal combination meter comprising:
   a processing device; and
   a non-transitory, processor-readable storage medium, the non-transitory, processor-readable storage medium comprising one or more programming instructions that, when executed, cause the processing device to:
      monitor one or more data transmissions between an external manufacturing computer and a vehicle comprising the universal combination meter during manufacture of the vehicle;
      infer at least one of a model and a body type of the vehicle from information contained within the one or more data transmissions, wherein the information contained within the one or more data transmissions is germane to the at least one of the model and the body type and does not include either the model or the body type;
      retrieve at least one of an image, vehicle-specific features, and vehicle-specific information from a repository, wherein the at least one of the image, vehicle-specific features, and vehicle-specific information correspond to the at least one of the model and the body type of the vehicle; and load the at least one of the image, the vehicle-specific features, and the vehicle-specific information into a memory for displaying.

2. The universal combination meter of claim 1, wherein the one or more programming instructions that, when executed, cause the processing device to monitor one or more data transmissions further cause the processing device to monitor one or more data transmissions between the external manufacturing computer and an electronic control unit in the vehicle.

3. The universal combination meter of claim 1, wherein the one or more programming instructions that, when executed, cause the processing device to monitor one or more data transmissions further cause the processing device to monitor a controller area network bus for data transmissions.

4. The universal combination meter of claim 1, wherein the one or more programming instructions that, when executed, cause the processing device to infer the at least one of the model and the body type further cause the processing device to:
determine the model of the vehicle;
monitor one or more additional data transmissions between the external manufacturing computer and the vehicle; and
determine a specific body type of the model from the one or more additional data transmissions.

5. The universal combination meter of claim 1, wherein the vehicle-specific information comprises information that relates to the particular vehicle with respect to at least one of a tire pressure, an open or closed status of a door, an open or closed status of an engine bay hood, a fuel level, and an engine coolant temperature.

6. The universal combination meter of claim 1, wherein the vehicle-specific features comprise at least one of a number of doors on the vehicle, a location of each of the doors on the vehicle, an orientation of each of the doors on the vehicle, a movement of each of the doors on the vehicle, and a location of an engine bay hood.

7. The universal combination meter of claim 1, wherein the universal combination meter further comprises the repository.

8. The universal combination meter of claim 1, further comprising a display.

9. The universal combination meter of claim 7, wherein the non-transitory, processor-readable storage medium further comprises one or more programming instructions that, when executed, cause the processing device to:
direct the display to display the at least one of the image, the vehicle-specific features, and the vehicle-specific information.

10. A method of customizing a universal combination meter, the method comprising:
monitoring, by a processing device, one or more data transmissions between an external manufacturing computer and a vehicle comprising the universal combination meter during manufacture of the vehicle;
inferring at least one of a model and a body type of the vehicle from information contained within the one or more data transmissions, wherein the information contained within the one or more data transmissions is germane to the at least one of the model and the body type and does not include either the model or body type;
retrieving at least one of an image, vehicle-specific features, and vehicle-specific information from a repository, wherein the at least one of the image, vehicle-specific features, and vehicle-specific information correspond to the at least one of the model and the body type of the vehicle; and
loading the at least one of the image, the vehicle-specific features, and the vehicle-specific information into a memory for displaying.

11. The method of claim 10, wherein monitoring the one or more data transmissions comprises monitoring, by the processing device, one or more data transmissions between the external manufacturing computer and an electronic control unit in the vehicle.

12. The method of claim 10, wherein monitoring the one or more data transmissions comprises monitoring, by the processing device, a controller area network bus for data transmissions.

13. The method of claim 10, wherein inferring the at least one of the model and the body type further comprises:
determining the model of the vehicle;
monitoring one or more additional data transmissions between the external manufacturing computer and the vehicle; and
determining a specific body type of the model from the one or more additional data transmissions.

14. The method of claim 10, wherein the vehicle-specific information comprises information that relates to the particular vehicle with respect to at least one of a tire pressure, an open or closed status of a door, an open or closed status of an engine bay hood, a fuel level, and an engine coolant temperature.

15. The method of claim 10, wherein the vehicle-specific features comprise at least one of a number of doors on the vehicle, a location of each of the doors on the vehicle, an orientation of each of the doors on the vehicle, a movement of each of the doors on the vehicle, and a location of an engine bay hood.

16. The method of claim 10, further comprising:
directing a display to display the at least one of the image, the vehicle-specific features, and the vehicle-specific information.

17. An electronic dashboard of a vehicle, the electronic dashboard comprising:
a universal combination meter comprising:
a display;
a vehicle information repository;
a processing device; and
a non-transitory, processor-readable storage medium, the non-transitory, processor-readable storage medium comprising one or more programming instructions that, when executed, cause the processing device to:
monitor one or more data transmissions between an external manufacturing computer and the vehicle during manufacture of the vehicle;
infer at least one of a model and a body type of the vehicle from information contained within the one or more data transmissions, wherein the information contained within the one or more data transmissions is germane to the at least one of the model and the body type and does not include either the model or the body type;
retrieve at least one of an image, vehicle-specific features, and vehicle-specific information from the vehicle information repository, wherein the at least one of the image, vehicle-specific features, and vehicle-specific information correspond to the at least one of the model and the body type of the vehicle; and load the at least one of the image, the vehicle-specific features, and the vehicle-specific information into a memory for displaying on the display.

\* \* \* \* \*